US011897010B2

(12) United States Patent
Kelle et al.

(10) Patent No.: US 11,897,010 B2
(45) Date of Patent: Feb. 13, 2024

(54) HEATABLE HIGH PRESSURE CLEANING APPLIANCE

(71) Applicant: Alfred Kärcher SE & Co. KG, Winnenden (DE)

(72) Inventors: Stefan Kelle, Heidelberg (DE); Ralph Seitter, Backnang (DE); Zheyi Jin, Backnang (DE); Denis Dammkoehler, Backnang (DE); Stefan Ehrhardt, Winnenden (DE)

(73) Assignee: Alfred Kärcher SE & Co. KG, Winnenden (DE)

( * ) Notice: Subject to any disclaimer, the term of this patent is extended or adjusted under 35 U.S.C. 154(b) by 262 days.

(21) Appl. No.: 17/198,074

(22) Filed: Mar. 10, 2021

(65) Prior Publication Data

US 2021/0187562 A1 Jun. 24, 2021

Related U.S. Application Data

(63) Continuation of application No. PCT/EP2019/072518, filed on Aug. 22, 2019.

(30) Foreign Application Priority Data

Sep. 11, 2018 (DE) ..................... 10 2018 122 145.2

(51) Int. Cl.
*B08B 3/10* (2006.01)
*B08B 3/02* (2006.01)
(Continued)

(52) U.S. Cl.
CPC ............ *B08B 3/10* (2013.01); *B05C 11/1042* (2013.01); *B08B 3/02* (2013.01); *B08B 13/00* (2013.01);
(Continued)

(58) Field of Classification Search
CPC .. B08B 3/02; B08B 3/026; B08B 3/10; B08B 13/00; B08B 2203/007; B08B 2203/0223;
(Continued)

(56) References Cited

U.S. PATENT DOCUMENTS 5,221,193 A 6/1993 Stougaard
8,714,168 B2 5/2014 Schwab
(Continued)

FOREIGN PATENT DOCUMENTS

CN 1573048 2/2005
CN 103415355 11/2013
(Continued)

*Primary Examiner* — Benjamin L Osterhout
(74) *Attorney, Agent, or Firm* — Womble Bond Dickinson (US) LLP

(57) ABSTRACT

A heatable high pressure cleaning appliance is provided with an undercarriage and a housing lower part, arranged on the undercarriage, in which a motor and a pump driven by the motor for pressurizing water are arranged, and with a fuel-operated heat exchanger for heating the water and a fuel tank for storing liquid fuel for the heat exchanger. In order to further develop the heatable high pressure cleaning appliance in such a way that it has a high mechanical stability and is producible in a cost-effective manner, it is proposed that the fuel tank is configured as a one-piece plastic hollow body, which forms the housing lower part and is held on a rigid support frame, wherein the support frame forms a shock protector that at least partially surrounds the fuel tank in the circumferential direction.

33 Claims, 7 Drawing Sheets

(51) Int. Cl.
*B08B 13/00* (2006.01)
*B05C 11/10* (2006.01)

(52) U.S. Cl.
CPC ......... *B08B 3/026* (2013.01); *B08B 2203/007* (2013.01); *B08B 2203/0211* (2013.01); *B08B 2203/0223* (2013.01); *B08B 2203/0276* (2013.01)

(58) Field of Classification Search
CPC ..... B08B 2203/0211; B08B 2203/0276; B05C 11/1042
See application file for complete search history.

(56) References Cited

U.S. PATENT DOCUMENTS

| | | | | |
|---|---|---|---|---|
| 9,414,732 | B2 | 8/2016 | Kelle et al. | |
| 2006/0038034 | A1* | 2/2006 | Hillary | B05B 9/0855 239/722 |
| 2007/0215397 | A1 | 9/2007 | Suzuki | |
| 2008/0079264 | A1 | 4/2008 | Serdynski et al. | |
| 2009/0269218 | A1* | 10/2009 | Gardner | B08B 3/026 417/234 |
| 2011/0081260 | A1* | 4/2011 | Klika | F04B 17/05 417/364 |
| 2011/0081261 | A1* | 4/2011 | Klika | B05B 9/002 417/364 |
| 2012/0124955 | A1* | 5/2012 | Klika | F04B 17/05 56/17.3 |
| 2013/0284747 | A1* | 10/2013 | Rund | B60K 15/067 220/562 |
| 2013/0333771 | A1 | 12/2013 | Kelle et al. | |
| 2014/0251390 | A1 | 9/2014 | Khan et al. | |
| 2016/0160753 | A1* | 6/2016 | Boutot | F02B 63/048 220/23.83 |
| 2017/0120305 | A1 | 5/2017 | Krauter et al. | |
| 2018/0133729 | A1* | 5/2018 | Masters | A47L 11/4091 |
| 2019/0115604 | A1* | 4/2019 | Takeyama | H01M 8/04089 |

FOREIGN PATENT DOCUMENTS

| | | |
|---|---|---|
| CN | 104114291 | 10/2014 |
| CN | 204641385 | 9/2015 |
| CN | 205130916 | 4/2016 |
| DE | 93 03 648 | 6/1993 |
| DE | 44 11 040 C1 | 4/1995 |
| JP | 2006021172 | 1/2006 |
| WO | WO 2008/030799 | 3/2008 |
| WO | WO 2011/044938 | 4/2011 |
| WO | WO 2012/119641 | 9/2012 |

* cited by examiner

HEATABLE HIGH PRESSURE CLEANING APPLIANCE

CROSS-REFERENCE TO RELATED APPLICATIONS

This application is a continuation of international application number PCT/EP2019/072518 filed on Aug. 22, 2019, and claims the benefit of German application number 10 2018 122 145.2 filed on Sep. 11, 2018, which applications are incorporated herein by reference in their entirety and for all purposes.

BACKGROUND OF THE INVENTION

The invention relates to a heatable high pressure cleaning appliance with an undercarriage on which a plurality of wheels are rotatably mounted, and with a housing lower part, arranged on the undercarriage, in which a motor and a pump driven by the motor for pressurizing water are arranged, and with a fuel-operated heat exchanger for heating the water and a fuel tank for storing liquid fuel for the heat exchanger.

Using heatable high pressure cleaning appliances, water can be pressurized by means of a pump and be heated by means of a heatable heat exchanger. The heated and pressurized water can be directed at an object to be cleaned. The heat exchanger is typically operated using a liquid fuel, for example heating oil or diesel fuel, and may comprise a coiled tubing which is heated by a burner and through which the water is conducted. The liquid fuel for operating the heat exchanger is stored in a fuel tank. Heatable high pressure cleaning appliances of that kind are known e.g. from WO 2012/119641 A2.

Heatable high pressure cleaning appliances of the kind being discussed here are used, among other things, on construction sites and other rough environmental conditions and should therefore have a high mechanical stability. In addition, the high pressure cleaning appliances should be producible as cost-effectively as possible.

In accordance with an embodiment of the invention, a heatable high pressure cleaning appliance of the kind stated at the outset is provided, which has high mechanical stability and is producible in a cost-effective manner.

SUMMARY OF THE INVENTION

In accordance with an embodiment of the invention, a heatable high pressure cleaning appliance of the generic type is provided, in which the fuel tank is configured as a one-piece plastic hollow body, which forms the housing lower part and is held on a rigid support frame, wherein the support frame forms a shock protector that at least partially surrounds the fuel tank in the circumferential direction.

The heatable high pressure cleaning appliance in accordance with the invention is distinguished, among other things, by the use of a fuel tank, which not only performs the function of storing liquid fuel, but which also forms the housing lower part, in which the motor and the pump driven by the motor are arranged. The fuel tank is configured as a one-piece plastic hollow body and thus has an internal volume for accommodating liquid fuel, for example for accommodating heating oil or diesel fuel. The fuel tank is configured as a seamless hollow body. This gives the fuel tank a significant mechanical stability. The configuration of the fuel tank in the form of a one-piece plastic hollow body also makes it possible to produce the fuel tank in a cost-effective manner.

In order to further increase the mechanical stability of the high pressure cleaning appliance in accordance with the invention, the fuel tank configured as a one-piece plastic hollow body is held on a rigid support frame. The support frame has the function, for one, of supporting the fuel tank and, for another, it forms a shock protector for the fuel tank, at least partially surrounding the fuel tank in the circumferential direction and thereby protecting same from shocks in the case of an accidental impact against an obstacle.

It is favorable if the support frame completely surrounds the fuel tank in the circumferential direction.

It is particularly favorable if the support frame forms the undercarriage of the heatable high pressure cleaning appliance. Preferably at least two wheels are mounted on the undercarriage so as to be rotatable about a common rotational axis.

In addition, at least one steering roller is favorably rotatably mounted on the undercarriage.

It is advantageous if the support frame projects beyond a front side and a rear side of the fuel tank in relation to a main movement direction. When the high pressure cleaning appliance travels in the main movement direction or counter to the main movement direction and hereby impacts an obstacle, the associated shock load is absorbed by the support frame, which projects beyond the front side and beyond the rear side of the fuel tank.

The heat exchanger is preferably arranged behind the fuel tank in relation to the main movement direction of the high pressure cleaning appliance and the support frame projects counter to the main movement direction beyond the heat exchanger.

The support frame preferably also forms a shock protector for the heat exchanger by also at least partially surrounding the heat exchanger in the circumferential direction.

It is particularly advantageous if the support frame projects transversely to the main movement direction of the high pressure cleaning appliance beyond a first longitudinal side and a second longitudinal side of the fuel tank. It is thereby ensured that even when the high pressure cleaning appliance impacts an obstacle from the side, the mechanical load associated therewith is absorbed by the support frame.

In an advantageous embodiment of the invention, the support frame comprises two rigid side frame parts, which are arranged on mutually opposing longitudinal sides of the fuel tank The rigid side frame parts give the support frame a particularly high mechanical stability and protect the fuel tank from mechanical loads that act on the high pressure cleaning appliance in the region of the longitudinal sides of the fuel tank.

The side frame parts are preferably each configured as self-contained support frame side portions. The self-contained configuration of the support frame side portions gives the support frame a particularly high mechanical stability in the region of the side frame parts.

The self-contained support frame side portions may, for example, extend along the entire periphery of a preferably planar geometric figure, in particular along the perimeter of a circle, oval, or polygon, especially a polygon with rounded corners.

It is advantageous if a covering that covers a face side of the pump is removably held at least on a side frame part. By way of the removable covering, for example, a service technician obtains easy access to a face side of the pump in order to perform service on the pump.

The removable covering may be configured in the form of a flat material, in particular in the form of a metal sheet, preferably in the form of a perforated metal sheet.

The covering is preferably screwed or releasably latched to the side frame part.

It is favorable if an opening is arranged between the side frame part and the covering, because the user can obtain access to the face side of the pump by way of the opening without having to necessarily remove the covering from the side frame part. This makes it easier for the user to, for example, perform adjustments on the face side of the pump, in particular to adjust the output pressure of the water pressurized by the pump, or for example to fill a refill container with a descaling solution.

In an advantageous embodiment of the invention, the support frame comprises a rigid front frame part, which is arranged on the front side of the fuel tank.

In an advantageous embodiment of the invention, the front frame part is configured as a U-shaped support frame front portion.

Provision may be made for the support frame to comprise a rigid base frame part, which forms the undercarriage of the high pressure cleaning appliance. For example at least two wheels and additionally at least one steering roller may be rotatably mounted on the rigid base frame part.

The base frame part is preferably configured as a U-shaped support frame base portion. It is hereby favorable if the support frame base portion comprises two legs oriented in parallel to the main movement direction of the high pressure cleaning appliance, said legs being connected to one another by way of a web oriented transversely to the main movement direction of the high pressure cleaning appliance and the free ends of which facing away from the web are connected to one another by way of a traverse. The traverse may, for example, be configured in the form of a metal sheet.

In an advantageous embodiment of the invention, the support frame comprises at least one rigid rear frame part, which projects beyond the rear side of the fuel tank and forms a grip of the high pressure cleaning appliance. The user can guide the high pressure cleaning appliance using the grip.

The at least one rear frame part preferably also projects beyond the rear side of the heat exchanger, assuming said heat exchanger is arranged behind the fuel tank in relation to the main movement direction of the high pressure cleaning appliance.

It is particularly advantageous if the support frame comprises two rigid rear frame parts, which are arranged at a distance from one another and project beyond the rear side of the fuel tank and preferably also beyond the rear side of the fuel tank and each form a grip of the high pressure cleaning appliance.

At least one rigid rear frame part is preferably of stirrup-shaped configuration.

It is particularly advantageous if the at least one rigid rear frame part is rigidly connected to a side frame part of the support frame. In particular, provision may be made for the at least one rear frame part to be welded to a side frame part.

As already mentioned, the heatable high pressure cleaning appliance in accordance with the invention may be used, in particular, on construction sites. It may hereby be necessary to lift the high pressure cleaning appliance using a lifting device, for example using a crane. In a particularly preferable embodiment of the high pressure cleaning appliance in accordance with the invention, the support frame comprises a rigid attachment frame part for attaching a crane hook or a lifting strap. The crane hook or lifting strap can thus engage directly on the rigid attachment frame part of the support frame in order to lift the entire high pressure cleaning appliance. A mechanical load on the fuel tank when lifting the high pressure cleaning appliance is thereby avoided.

The attachment frame part favorably engages over the fuel tank. For example, it may extend from a first rigid side frame part of the support frame that is arranged on a first longitudinal side of the fuel tank to a second rigid side frame part of the support frame that is positioned on the opposite second longitudinal side of the fuel tank.

The attachment frame part of the support frame is arranged between the motor and the fuel tank in relation to the main movement direction of the high pressure cleaning appliance.

In order to prevent unintentional movement of the crane hook or the lifting strap relative to the attachment frame part, the attachment frame part preferably comprises two support frame attachment portions, which are oriented at an angle to one another and are rigidly connected to one another. The crane hook can be positioned in the connecting region between the two support frame attachment portions arranged at an angle to one another.

The two support frame attachment portions are favorably aligned at an obtuse angle to one another, for example at an angle of 150° to 175°.

The support frame preferably consists of metal, because this gives the support frame a particularly high mechanical stability.

In an advantageous embodiment of the invention, the support frame comprises a plurality of a bent pipes that are rigidly connected to one another. In particular, provision may be made for the support frame to be configured in the form of a pipe frame. In an embodiment of that kind, the support frame forms a supporting metal structure that consists of pipes that are rigidly connected to one another, in particular welded to one another.

Steel is preferably used for the production of the support frame.

It is advantageous if the support frame comprises a base plate on which the heat exchanger is arranged. The base plate preferably consists of metal.

As mentioned at the outset, the fuel tank configured as a seamless plastic hollow body forms the housing lower part, in which the motor and the pump are arranged. It is advantageous if the fuel tank forms a motor receiving part, into which the motor is insertable and which comprises supporting bodies for supporting the motor.

The supporting bodies are preferably of hollow configuration.

Provision may be made, for example, for the motor to comprise a housing, from which a plurality of holding arms protrude, which each can be supported by a supporting body of the motor receiving part.

It is particularly favorable if the motor receiving part comprises a through-duct, which is molded into the fuel tank and extends from a top side to a bottom side of the fuel tank. The motor may cover the through-duct, wherein the through-duct enables a circulation of air, which surrounds the motor and dissipates heat from the motor.

In order to be able to supply water to the high pressure cleaning appliance that is pressurized by the pump, the high pressure cleaning appliance can be connected e.g. to a public water supply network. In the case of such a connection to a public water supply network, the network operator often requires that it be ensured by means of appropriate measures that water taken from the water supply network cannot unintentionally be returned to the water supply network. This is to ensure that the water supply network cannot come into contact with water that is possibly contaminated. In order to fulfill this requirement, the high pressure cleaning appliance in accordance with the invention comprises, in a preferred embodiment, a decoupling tank with an inlet that can be connected to a water supply network and with an outlet that is in flow connection with the pump. Water taken from the water supply network can first flow into the decoupling tank and then to the pump. The inlet of the decoupling tank is favorably arranged on the top side thereof, such that water from the water supply network is able to enter the decoupling tank, but it is not possible for the water to readily return from the decoupling tank back into the water supply network.

It is particularly advantageous if the fuel tank configured as a one-piece plastic hollow body comprises a recess that forms the decoupling tank which forms the decoupling tank that comprises an inlet connectable to a water supply network and that is in flow connection with the pump.

The recess may, for example, be configured in the form of a pocket.

A fill level-dependent valve, for example a float valve, is preferably arranged at the inlet of the decoupling tank. By means of the fill level-dependent valve, it can be ensured in a constructively simple manner that the decoupling tank does not overflow. Rather, the fill level-dependent valve closes and interrupts the connection from the water supply network to the decoupling tank when the fill level of the decoupling tank reaches a maximum level.

For increasing a particularly good cleaning effect, provision may be made for a liquid cleaning agent that is stored in a cleaning agent tank to be admixed to the water.

The fuel tank of the heatable high pressure cleaning appliance in accordance with the invention favorably forms a multi-functional part that, for one, serves to store liquid fuel and, for another, gives the high pressure cleaning appliance a significant mechanical stability and that, moreover, forms the housing lower part, which accommodates the motor and the pump and preferably also a blower driven by the motor, wherein air can be supplied to the heat exchanger by means of the blower. Moreover, the fuel tank may comprise a preferably pocket-shaped recess, which forms a decoupling tank. The fuel tank configured as a multi-functional part may also form a motor receiving part, into which the motor is insertable.

The configuration of the fuel tank as a multi-functional component makes it possible to significantly reduce the production costs of the high pressure cleaning appliance. Moreover, the provision of recesses also has the advantage that the fuel tank has a high mechanical strength.

The fuel tank is favorably produced by rotational molding. This production method enables a particularly robust configuration of the fuel tank. The fuel tank produced by rotational molding can be produced in one single operation. Impact resistant plastics may hereby be used, such that a fuel tank can be produced that is particularly mechanically resistant.

In addition to a housing lower part that is formed by the fuel tank, in an advantageous embodiment, the heatable high pressure cleaning appliance in accordance with the invention comprises a housing upper part that is arranged on the housing lower part.

The housing upper part may be configured e.g. in the form of a hood that covers the housing lower part.

The housing upper part is favorably configured as a one-piece, in particular closed plastic hollow body. This gives the housing upper part a high mechanical strength.

The housing upper part is preferably produced by rotational molding. As explained above, by means of a production method of that kind, a component that is particularly mechanically resistant can be produced in a cost-effective manner.

As already mentioned, it is favorable if the rigid support frame on which the fuel tank is held comprises an attachment frame part for attaching a crane hook or a lifting strap. It is advantageous if the housing upper part comprises a through-channel that extends from a top side of the housing upper part to a bottom side of the housing upper part, wherein the attachment frame part of the support frame is accessible to the user by way of the through-channel. In that kind of an embodiment of the invention, the user is able to pass, for example, a crane hook or a lifting strap through the through-channel of the housing upper part in order to fix the crane hook or the lifting strap on the attachment frame part of the support frame. The handling of the high pressure cleaning appliance during the transport thereof by means of a lifting device is thereby simplified.

A further simplification of the handling of the high pressure cleaning appliance is achieved in an advantageous embodiment of the invention in that the housing upper part forms at least one hook for wrapping up a hose and/or an electrical cable. For example, a pressure hose and/or an electrical supply cable can be wrapped on a hook formed by the housing upper part.

The subsequent description of a preferable embodiment of the invention serves in conjunction with the drawing for further explanation.

DETAILED DESCRIPTION OF THE INVENTION

Figure 1:
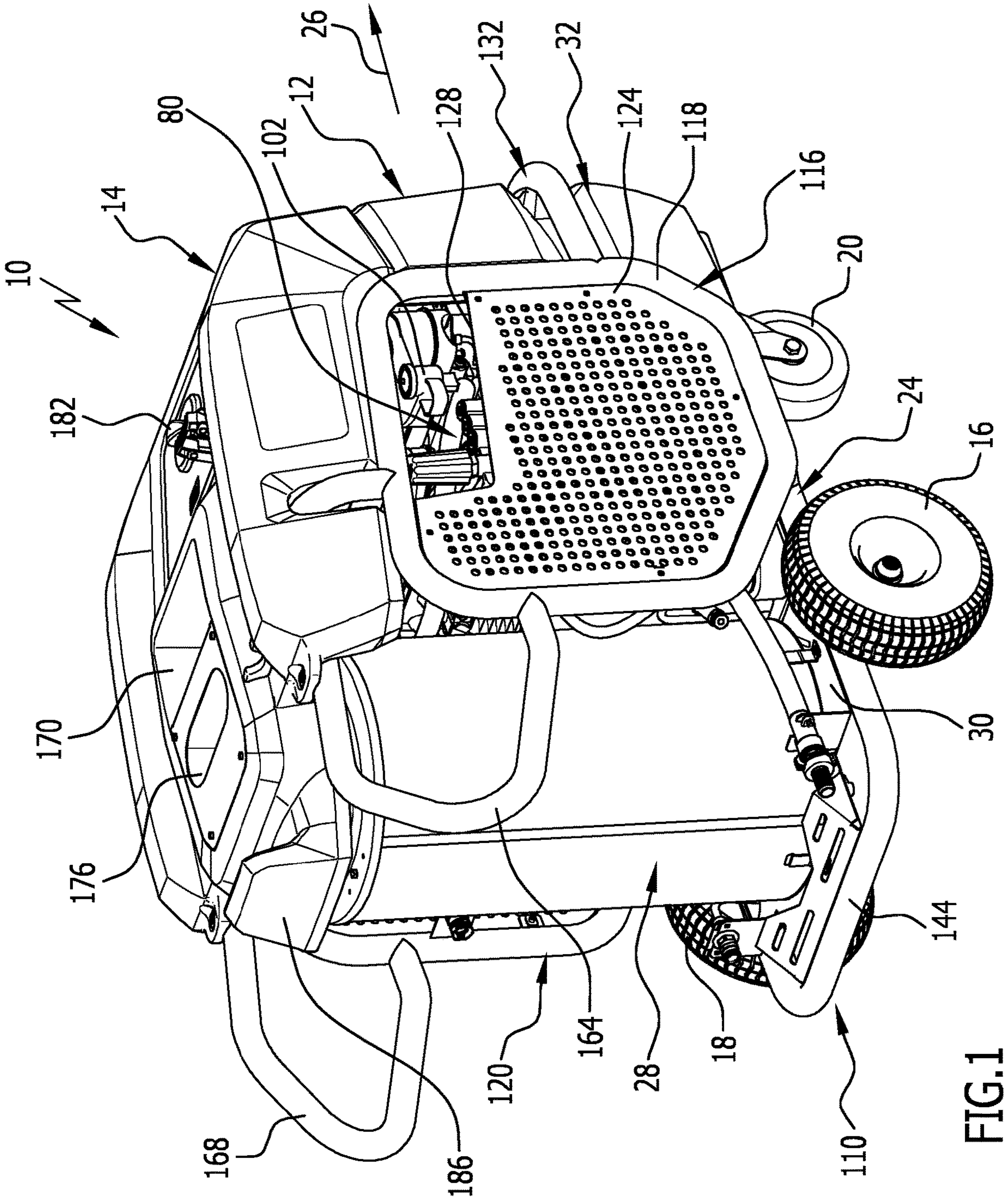
FIG. 1 shows a perspective depiction of a heatable high pressure cleaning appliance obliquely from behind.

Schematically depicted in the drawing is an advantageous embodiment of a heatable high pressure cleaning appliance in accordance with the invention, which is designated as a whole with the reference numeral 10. The high pressure cleaning appliance 10 comprises a housing lower part 12 as well as a housing upper part 14 that is arranged on the housing lower part 12 and covers same.

Figure 2:
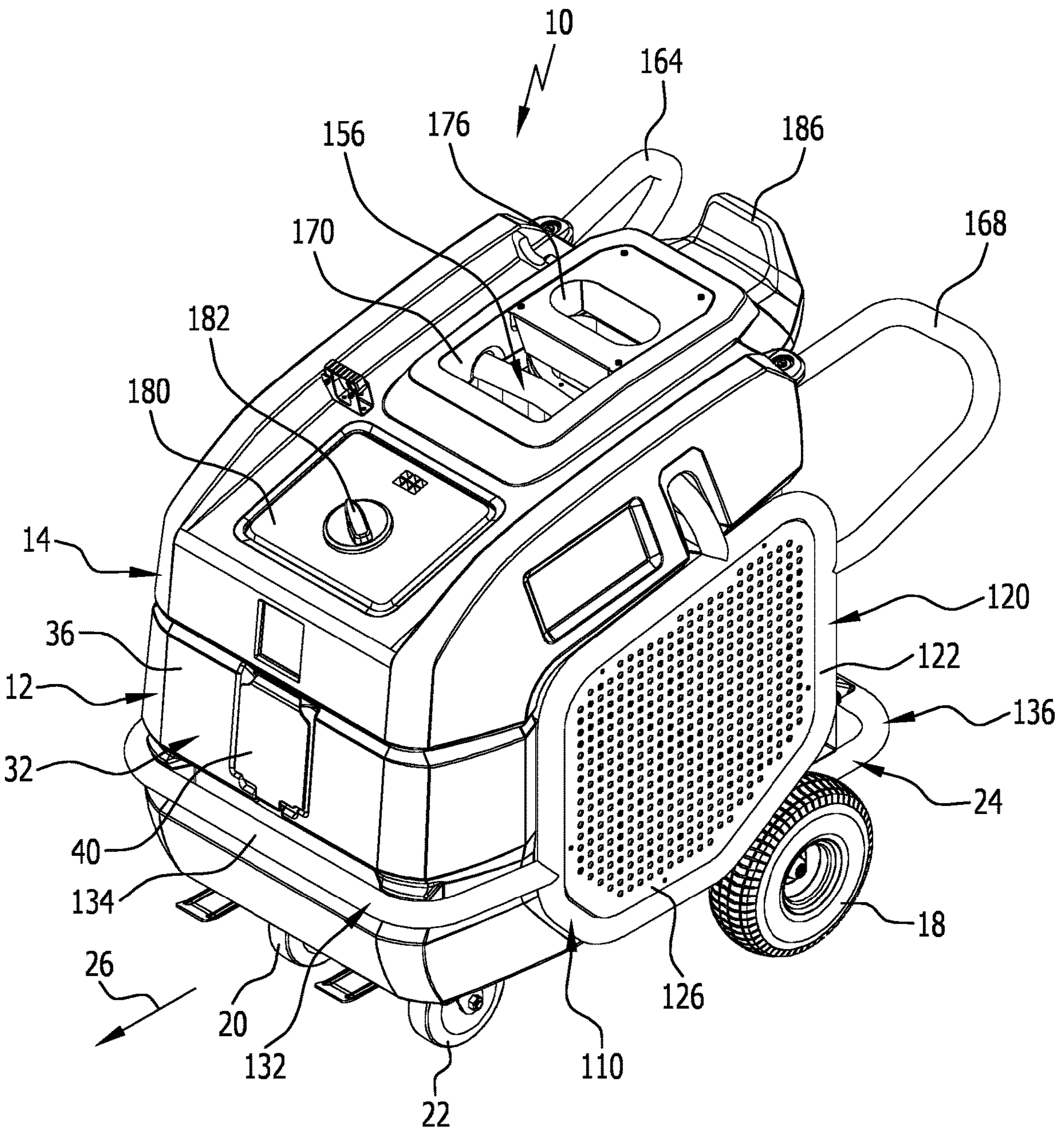
FIG. 2 shows a perspective depiction of the high pressure cleaning appliance from FIG. 1 obliquely from the front.
Figure 3:
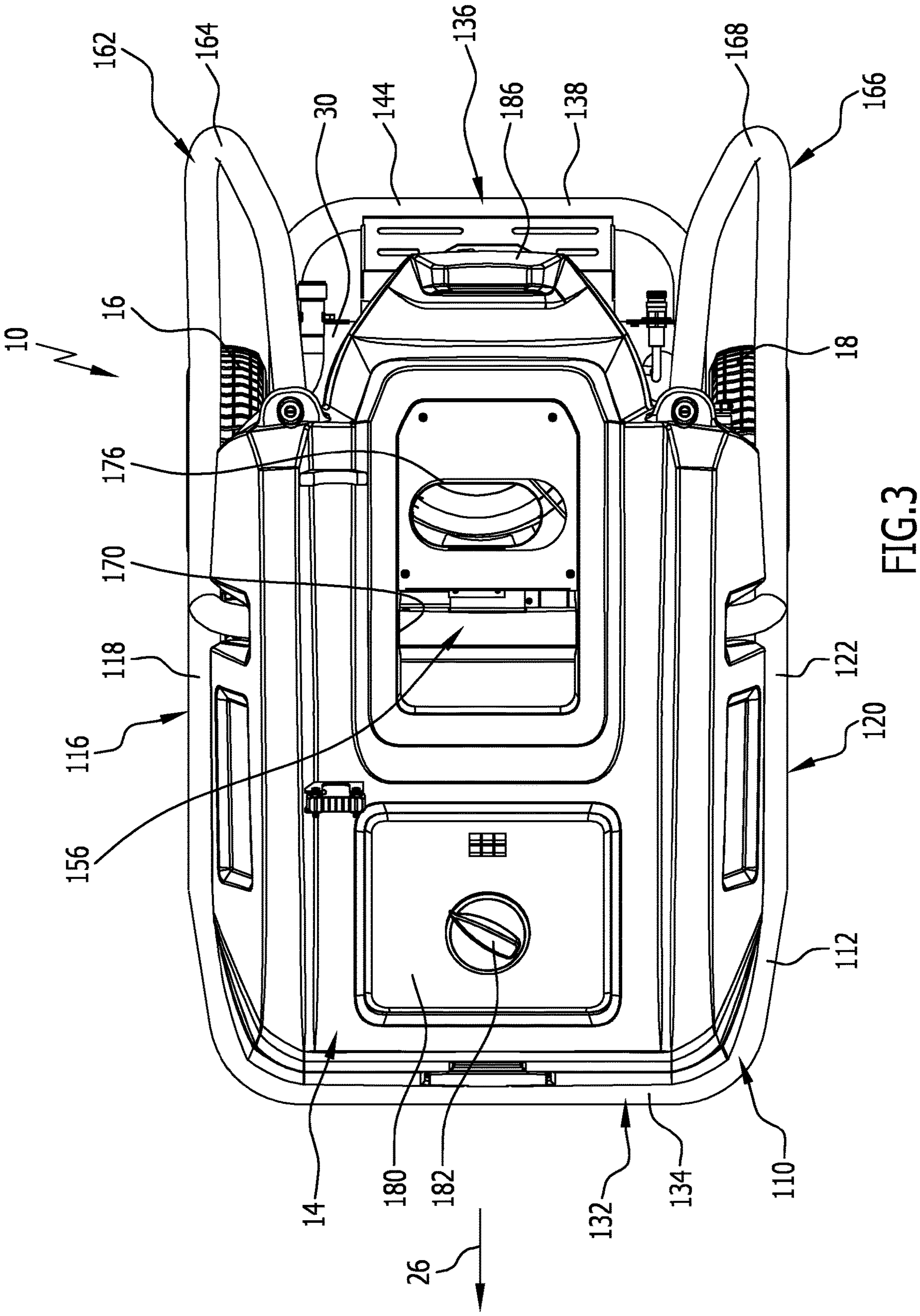
FIG. 3 shows a plan view of the high pressure cleaning appliance from FIG. 1.

The high pressure cleaning appliance 10 is configured to be able to move. For this purpose, it comprises two wheels 16, 18 as well as two steering rollers 20, 22. The wheels 16, 18 and the steering rollers 20, 22 are rotatably mounded on an undercarriage 24. A main movement direction of the high pressure cleaning appliance 10 is indicated in FIGS. 1, 2 and 3 by the arrow 26.

A heatable heat exchanger 28 that is positioned on a base plate 30 is arranged on the undercarriage 24 behind the housing lower part 12 in the main movement direction 26.

The housing lower part 12 is formed by a fuel tank 32 that is configured as a one-piece plastic hollow body and can be filled with liquid fuel, in particular with heating oil or with diesel fuel, by way of a fill opening 34 for operating the heat exchanger 28. The fill opening 34 is arranged on a front side 36 of the fuel tank 32 and is closeable by means of a hinged lid 40.

In the embodiment depicted, the fuel tank 32 is made from a plastic material by means of rotational molding. It forms a seamless hollow body, the internal volume of which accommodates the liquid fuel.

Figure 4:
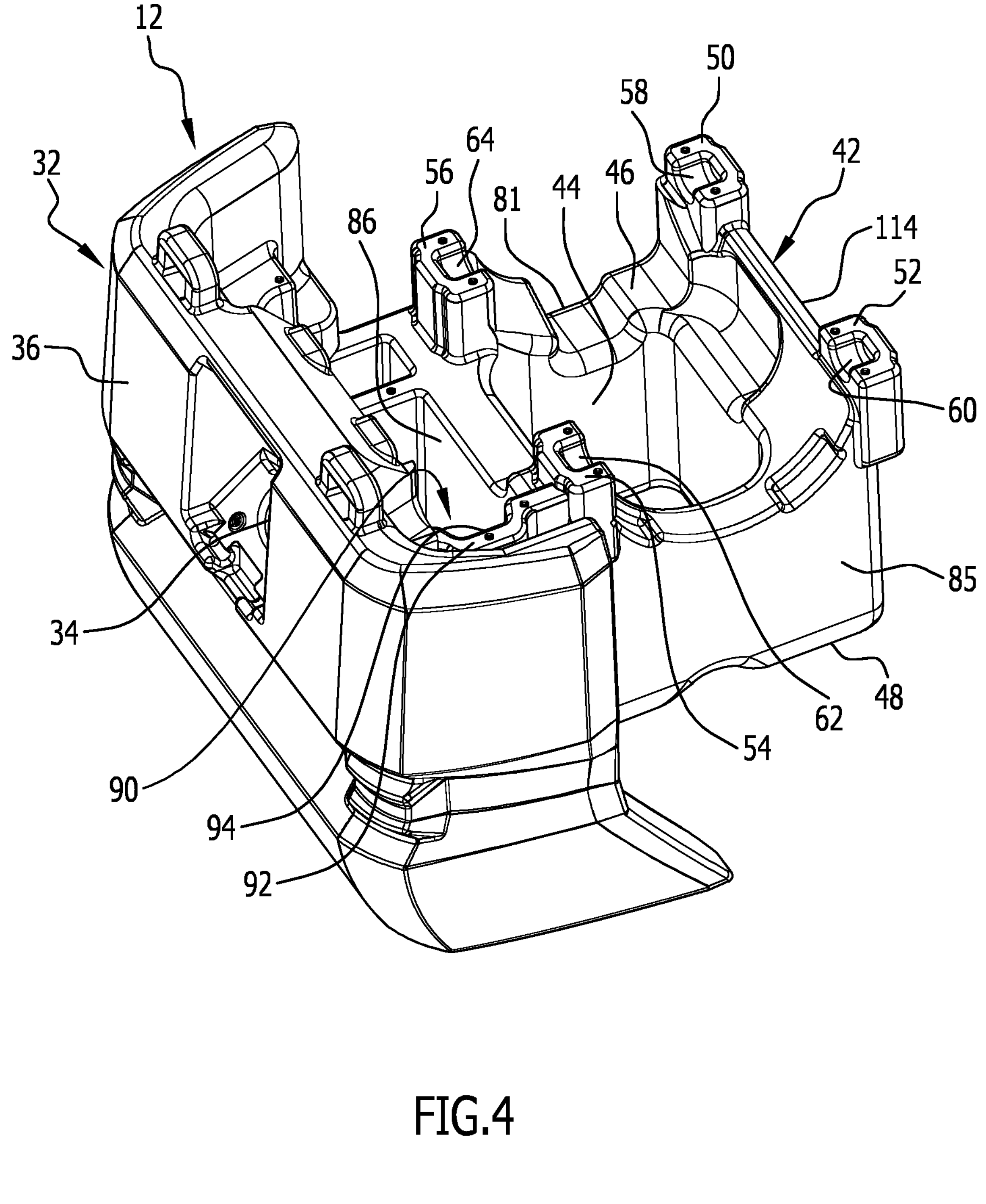
FIG. 4 shows a perspective depiction of a housing lower part of the high pressure cleaning appliance from FIG. 1 in the form of a fuel tank.
Figure 5:
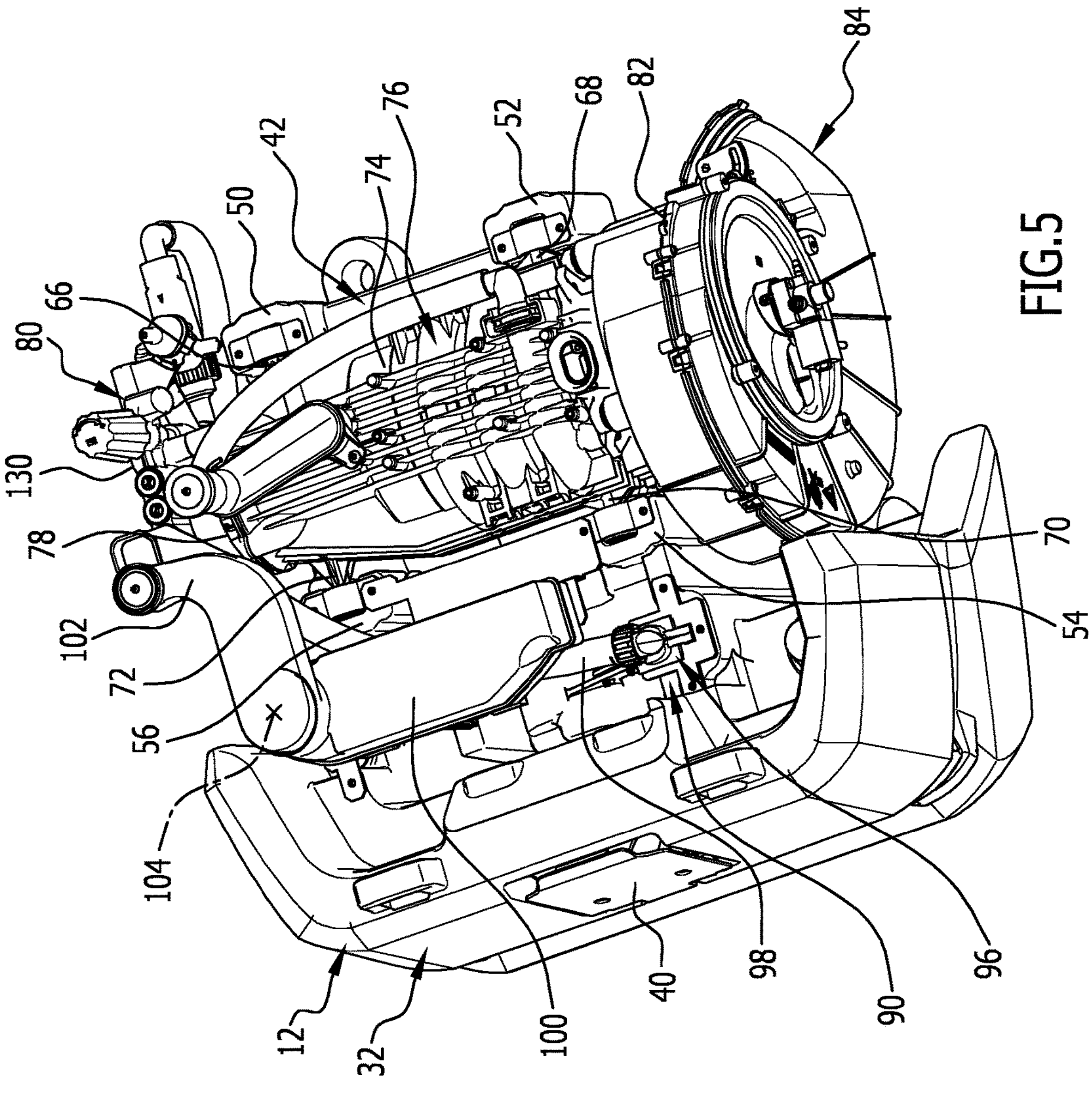
FIG. 5 shows a perspective depiction of the fuel tank from FIG. 4 with a motor that is inserted in a motor receiving part of the fuel tank.
Figure 6:
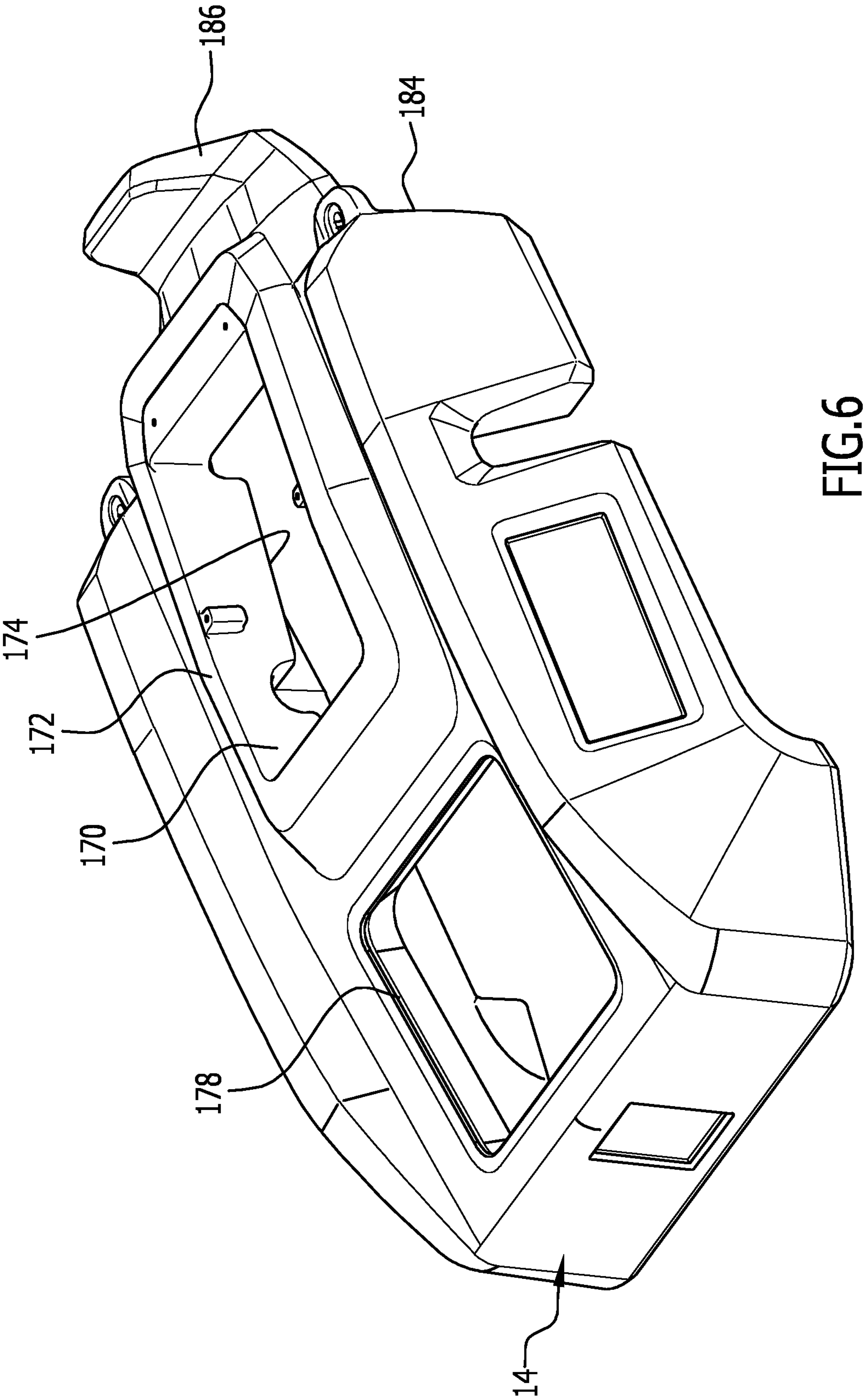
FIG. 6 shows a perspective depiction of a housing upper part of the high pressure cleaning appliance from FIG. 1.

As can be seen in particular in FIGS. 4 and 5, the fuel tank 32 forms, among other things, a motor receiving part 42, which comprises a through-duct 44 that extends from a top side 46 of the fuel tank 32 to a bottom side 48 of the fuel tank 32.

On its top side, the motor receiving part 42 comprises hollow supporting bodies 50, 52, 54, 56, which are arranged substantially at the corner points of the passage shaft 44 that is rectangular in plan view and each comprise a concave support face 58, 60, 62, 64. In each case a free end portion of a holding arm 66, 68, 70, 72 that projects outwardly from a motor housing 74 of an electric motor 76 can be positioned on the support faces 58, 60, 62, 64. The electric motor 76 can be inserted into the motor receiving part 42, covering the through-duct 44 and being supported by the supporting bodies 50, 52, 54, 56. A flow of air through the through duct 44 can form to cool the electric motor 76.

The electric motor 76 bears on a first motor end 78 a pump 80, which projects out of the motor receiving part 42 on a first longitudinal side 81 of the fuel tank 32, and on a second motor end 82 the electric motor 76 bears a blower 84, which projects out of the motor receiving part 42 on a second longitudinal side 85 of the fuel tank 32 that faces away from the first longitudinal side 81. By means of the pump 80, water can be pressurized, which can be directed at an object to be cleaned, and by means of the blower 84, air can be supplied to the heat exchanger 28. The heat exchanger may, as is typical, comprise a coiled tubing, which is heated by a burner and through which the water pressurized by the pump 80 is conducted in order to heat the water.

In the region between the motor receiving part 42 and the front side 36, the fuel tank 32 configured as a seamless hollow body forms a pocket-shaped recess 86. The recess 86 forms a decoupling tank 90 that comprises on its top side 92 an inlet 94 at which a fill level-dependent valve in the form of a float valve 96 is arranged. The decoupling tank 90 is in flow connection with a pump inlet of the pump 80 by way of an outlet not depicted in the drawing.

Connected to the float valve 96 is a water supply line 98, by way of which the decoupling tank 90 is connectable to a public water supply network, such that water can be fed from the water supply network to the decoupling tank 90, said water then being able to be pressurized by the pump 80 and then heated by the heat exchanger 28.

Arranged over the decoupling tank is a refill container 100 for a descaling solution, which can be admixed to the water in order to prevent calcification of the heat exchanger. The refill container 100 comprises a pivotable filler neck 102, which, for the purpose of filling the refill container, can be pivoted about a vertical pivotal axis 104 from its parking position depicted in FIG. 5 into a refilling position, not depicted in the drawing, in which the filler neck 102 projects beyond the first longitudinal side 81 of the fuel tank 32.

The fuel tank 32 is configured as a multi-functional part. In the form of a seamless hollow body, it forms not only a storage tank for liquid fuel, but also forms the entire housing lower part 12, which accommodates the electric motor 76 and the pump 80 as well as the blower 84, and which also forms the decoupling tank 90. The configuration in the form of a one-piece closed plastic hollow body gives the fuel tank 32 a significant mechanical stability, the mechanical stability being further increased by the pocket-shaped recess 86 and the through-duct 44.

Figure 7:
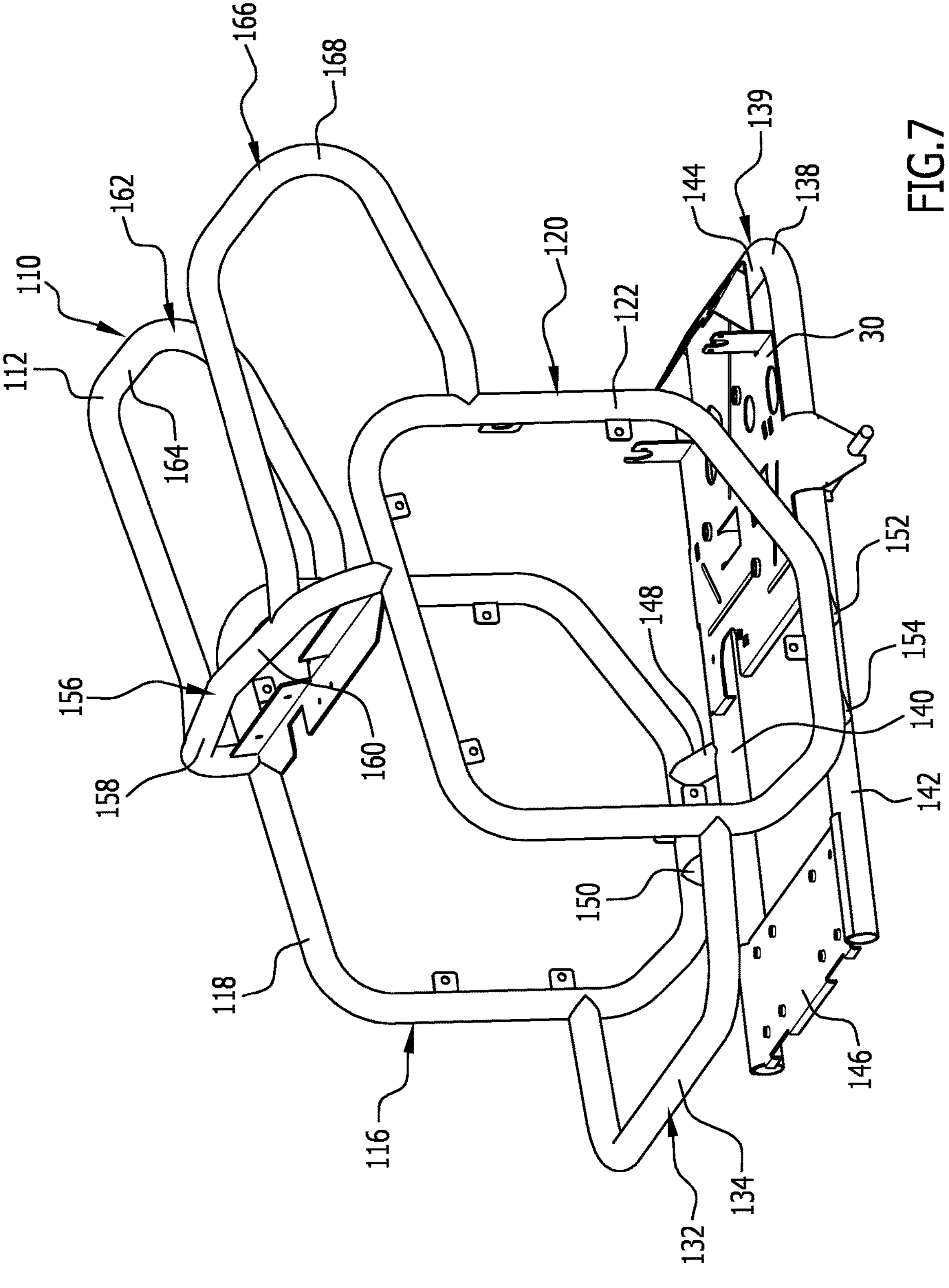
FIG. 7 shows a perspective depiction of a support frame of the high pressure cleaning appliance from FIG. 1.

For additionally increasing the mechanical stability, the high pressure cleaning appliance 10 comprises a supporting metal structure in the form of a support frame 110, which is formed by bent pipes that are rigidly connected to one another, and thus said support frame 110 is configured as a pipe frame 112. This is made clear in particular in FIG. 7.

The support frame 110 forms a shock protector for the fuel tank 32, which, in the embodiment depicted, completely surrounds the fuel tank 32 in the circumferential direction. In relation to the main movement direction 26, the support frame 110 projects beyond the front side 36 of the fuel tank 32 and also beyond the rear side 114 thereof. Moreover, the support frame 110 projects transversely to the main movement direction 26 beyond the longitudinal sides 81 and 85 of the fuel tank 32.

The support frame 110 comprises a first rigid side frame part 116, which is configured as a self-contained support frame side portion 118. The support frame 110 also comprises a second rigid side frame part 120, which is configured as a self-contained second support frame side portion 122. The first side frame part 116 is arranged on the first longitudinal side 81 of the fuel tank 32 and the second side frame part 120 is arranged on the opposing second longitudinal side 85 of the fuel tank 32. A first covering 124 in the form of a perforated metal sheet is removably held on the first side frame part 116, and a second covering 126 in the form of a second perforated metal sheet is removably held on the second side frame part 120. This is clear in particular from FIGS. 1 and 2. Arranged between the first covering 124 and the first side frame part 120 is an opening 128, which enables a user direct access to the face side 130 of the pump 80 facing away from the electric motor 76, in order to be able to perform, for example, adjustment work on the pump 80 and to be able to fill the refill container 100 with a descaling solution.

The two side frame parts 116, 120 are rigidly connected to one another by way of a front frame part 132 of the support frame 110. The front frame part 132 comprises a U-shaped support frame front portion 134, which extends from the first side frame part 116 along the front side 36 of the fuel tank 32 to the second side frame part 120.

The support frame 110 forms the undercarriage 24. For this purpose, the support frame 110 comprises a base frame part 136, which is configured as a U-shaped support frame base portion 138. The support frame base portion 138 comprises a first leg 140 and a second leg 142, which are oriented in parallel to the main movement direction 26 and are connected to one another in one piece by way of a web 144 oriented transversely to the main movement direction 26. The free ends of the two legs 140, 142 facing away from the web 144 are rigidly connected to one another by way of a traverse 146.

Arranged between the end portions of the two legs 140, 142 facing toward the web 144 is the aforementioned base plate 30, which bears the heat exchanger 28.

The first leg 140 is welded to the first side frame part 116 by way of two first pipe pieces 148, 150, and the second leg 142 is welded to the second side frame part 120 by way of two second pipe pieces 152, 154.

Moreover, the support frame 110 comprises a rigid attachment frame part 156, by way of which the first side frame part 116 is rigidly connected, on its top side facing away from the base frame part 136, to the second side frame part 120. The attachment frame part 156 engages over the fuel tank 32, extending transversely to the main movement direction 26. It comprises a first support frame attachment portion 158 and a second support frame attachment portion 160, which are oriented at an obtuse angle to one another and are connected to one another in one piece. In the connecting region between the first support frame attachment portion 158 and the second support frame attachment portion 160, a crane hook, which is not depicted so as to achieve a better overview, can engage around the attachment frame part 156 in order to lift the entire high pressure cleaning appliance 10.

A first rigid rear frame part 162, which is of stirrup-shaped configuration, extends from a rear side of the first side frame part 116 facing away from the front frame part 132 to the first support frame attachment portion 158 and forms a first grip 164 of the high pressure cleaning appliance 10. A second rigid rear frame part 166, which is also of stirrup-shaped configuration, extends from a rear side of the second side frame part 120 facing away from the front frame part 132 to the second support frame attachment portion 160 and forms a second grip 168 of the high pressure cleaning appliance 10. The two rear frame parts 162, 166, like the base frame part 136, projects counter to the main movement direction 26 beyond the rear side 114 of the fuel tank 32 and beyond the rear side of the heat exchanger 28.

The support frame 110 forms a shock protector, which ensures that the fuel tank 32 is not damaged upon unintentionally striking an obstacle.

The housing lower part 12 formed by the fuel tank 32 is covered by the housing upper part 14. The housing upper part 14 is configured as a one-piece closed plastic hollow body and is produced by rotational molding. It comprises a through-channel 170, which extends from a top side 172 of the housing upper part 14 to a bottom side 174 of the housing upper part 14 and which is passed through by an exhaust pipe 176 in a rear region facing away from the front side 36 of the fuel tank 32, by way of which exhaust pipe 176 exhaust gas from the heat exchanger 28 can be released.

In front of the exhaust pipe 176 in relation to the main movement direction 26, the through-channel 170 provides access to the attachment frame part 156 This makes it possible for the user to fix a crane hook or a lifting strap to the attachment frame part 156 of the support frame 100 without having to reveal the attachment frame part 156 by, for example, removing the housing upper part 14 from the housing lower part 12.

At a distance from the through-channel 170 in the main movement direction 26, the housing upper part 14 comprises a substantially rectangular perforation 178 on which an operating panel 180 is arranged, which bears on its top side a main switch 182 for switching the electric motor 76 on and off.

On its rear side 184, the housing upper part 14 forms a winding hook 186 on which, for example, a pressure hose and/or an electrical cable can be wound. The winding hook 186 is arranged between the first grip 164 and the second grip 168.

The high pressure cleaning appliance 10 is distinguished by low manufacturing costs and by a high mechanical stability. Both the housing lower part 12 and the housing upper part 14 are produced by rotational molding and form one-piece, seamless plastic hollow bodies. The housing lower part 12 is formed by the fuel tank 32, which is supported by the support frame 110 and which not only forms the undercarriage 24 of the high pressure cleaning appliance 10 but also a shock protector that prevents damage to the fuel tank 32 upon the high pressure cleaning appliance 10 impacting an obstacle.

The invention claimed is:

1. A heatable high pressure cleaning appliance with an undercarriage on which a plurality of wheels are rotatably mounted, and with a housing lower part, arranged on the undercarriage, in which a motor and a pump driven by the motor for pressurizing water are arranged, and with a fuel-operated heat exchanger for heating the water, and a fuel tank for storing liquid fuel for the heat exchanger, wherein the fuel tank is configured as a one-piece plastic hollow body, which forms the housing lower part and which is held on a rigid support frame, wherein the support frame forms a shock protector that at least partially surrounds the fuel tank in the circumferential direction.

2. The heatable high pressure cleaning appliance in accordance with claim 1, wherein the support frame forms the undercarriage.

3. The heatable high pressure cleaning appliance in accordance with claim 1, wherein the support frame projects beyond a front side and a rear side of the fuel tank in relation to a main movement direction of the high pressure cleaning appliance.

4. The heatable high pressure cleaning appliance in accordance with claim 1, wherein the support frame projects transversely to the main movement direction of the high pressure cleaning appliance beyond a first longitudinal side and a second longitudinal side of the fuel tank.

5. The heatable high pressure cleaning appliance in accordance with claim 1, wherein the support frame comprises two rigid side frame parts, which are arranged on mutually opposing longitudinal sides of the fuel tank.

6. The heatable high pressure cleaning appliance in accordance with claim 5, wherein the side frame parts are each configured as self-contained support frame side portions.

7. The heatable high pressure cleaning appliance in accordance with claim 5, wherein a covering is removably held at least on a side frame part, said covering covering a face side of the pump.

8. The heatable high pressure cleaning appliance in accordance with claim 7, wherein an opening is arranged between the at least one side frame part and the covering removably held thereon.

9. The heatable high pressure cleaning appliance in accordance with claim 1, wherein the support frame comprises a rigid front frame part, which is arranged on a front side of the fuel tank.

10. The heatable high pressure cleaning appliance in accordance with claim 9, wherein the front frame part is configured as a U-shaped support frame front portion.

11. The heatable high pressure cleaning appliance in accordance with claim 1, wherein the support frame comprises a rigid base frame part, which forms the undercarriage of the high pressure cleaning appliance.

12. The heatable high pressure cleaning appliance in accordance with claim 11, wherein the base frame part is configured as a U-shaped support frame base portion.

13. The heatable high pressure cleaning appliance in accordance with claim 1, wherein the support frame comprises at least one rigid back frame part, which projects beyond the rear side of the fuel tank and forms a grip of the high pressure cleaning appliance.

14. The heatable high pressure cleaning appliance in accordance with claim 13, wherein the support frame comprises two rigid rear frame parts, which are arranged at a distance from one another and project beyond the rear side of the fuel tank and each form a grip of the high pressure cleaning appliance.

15. The heatable high pressure cleaning appliance in accordance with claim 13, wherein at least one rigid rear frame part is of stirrup-shaped configuration.

16. The heatable high pressure cleaning appliance in accordance with claim 1, wherein the support frame comprises a rigid attachment frame part for attaching a crane hook or a lifting strap.

17. The heatable high pressure cleaning appliance in accordance with claim 16, wherein the attachment frame part engages over the fuel tank.

18. The heatable high pressure cleaning appliance in accordance with claim 16, wherein the attachment frame part is arranged between the motor and the fuel tank in relation to a main movement direction of the high pressure cleaning appliance.

19. The heatable high pressure cleaning appliance in accordance with claim 16, wherein the attachment frame part comprises two support frame attachment portions oriented at an angle to one another.

20. The heatable high pressure cleaning appliance in accordance with claim 16, wherein the high pressure cleaning appliance comprises a housing upper part, which is arranged on the housing lower part, wherein the housing upper part comprises a through-channel, which extends from a top side to a bottom side of the housing upper part, wherein the attachment frame part of the support frame is accessible to the user by way of the through-channel.

21. The heatable high pressure cleaning appliance in accordance with claim 1, wherein the support frame consists of metal.

22. The heatable high pressure cleaning appliance in accordance with claim 1, wherein the support frame comprises a plurality of bent pipes that are rigidly connected to one another.

23. The heatable high pressure cleaning appliance in accordance with claim 22, wherein the pipes are welded to one another.

24. The heatable high pressure cleaning appliance in accordance with claim 1, wherein the support frame comprises a base plate on which the heat exchanger is arranged.

25. The heatable high pressure cleaning appliance in accordance with claim 1, wherein the fuel tank forms a motor receiving part into which the motor is insertable and which comprises supporting bodies for supporting the motor.

26. The heatable high pressure cleaning appliance in accordance with claim 25, wherein the motor receiving part comprises a through-duct, which is molded into the fuel tank and extends from a top side to a bottom side of the fuel tank.

27. The heatable high pressure cleaning appliance in accordance with claim 1, wherein the fuel tank comprises a recess, which forms a decoupling tank that comprises an inlet connectable to a water supply network and that is in flow connection with the pump.

28. The heatable high pressure cleaning appliance in accordance with claim 27, wherein a fill level-dependent valve is arranged at the inlet of the decoupling tank.

29. The heatable high pressure cleaning appliance in accordance with claim 1, wherein the fuel tank is produced by rotational molding.

30. The heatable high pressure cleaning appliance in accordance with claim 1, wherein the high pressure cleaning appliance comprises a housing upper part, which is arranged on the housing lower part.

31. The heatable high pressure cleaning appliance in accordance with claim 30, wherein the housing upper part is configured as a one-piece closed plastic hollow body.

32. The heatable high pressure cleaning appliance in accordance with claim 30, wherein the housing upper part is produced by rotational molding.

33. The heatable high pressure cleaning appliance in accordance with claim 30, wherein the housing upper part forms at least one winding hook for winding up a hose and/or an electrical cable.

* * * * *